US012657563B2

(12) United States Patent
Hervey

(10) Patent No.: US 12,657,563 B2
(45) Date of Patent: Jun. 16, 2026

(54) HYBRID MULTI-TENANT CLOUD AND SINGLE-TENANT ON-PREMISES POINT-OF-SALE SYSTEMS

(71) Applicant: VeriFone, Inc., Wilmington, DE (US)

(72) Inventor: James Edward Hervey, Atlanta, GA (US)

(73) Assignee: VeriFone, Inc., Wilmington, DE (US)

(*) Notice: Subject to any disclaimer, the term of this patent is extended or adjusted under 35 U.S.C. 154(b) by 134 days.

(21) Appl. No.: 18/799,446

(22) Filed: Aug. 9, 2024

(65) Prior Publication Data

US 2024/0403850 A1    Dec. 5, 2024

Related U.S. Application Data

(62) Division of application No. 17/449,521, filed on Sep. 30, 2021, now Pat. No. 12,086,779.

(51) Int. Cl.
| | |
|---|---|
| *G06Q 20/00* | (2012.01) |
| *G06Q 20/04* | (2012.01) |
| *G06Q 20/20* | (2012.01) |
| *G06Q 20/22* | (2012.01) |

(52) U.S. Cl.
CPC ......... *G06Q 20/202* (2013.01); *G06Q 20/042* (2013.01); *G06Q 20/22* (2013.01)

(58) Field of Classification Search
CPC .... G06Q 20/202; G06Q 20/042; G06Q 20/22; G07G 1/14
USPC .......................................................... 705/21
See application file for complete search history.

(56) References Cited

U.S. PATENT DOCUMENTS

| | | | |
|---|---|---|---|
| 10,289,991 B1 | 5/2019 | Muller et al. | |
| 11,055,692 B1 | 7/2021 | Bodalia et al. | |
| 11,328,278 B2 | 5/2022 | Siefken et al. | |
| 2014/0019274 A1 | 1/2014 | Hardin et al. | |
| 2014/0149240 A1* | 5/2014 | Ansel ................... | G06Q 20/209 |
| | | | 705/21 |

(Continued)

FOREIGN PATENT DOCUMENTS

| | | | | |
|---|---|---|---|---|
| CN | 110741399 A * | 1/2020 | ........... | G06Q 20/202 |
| WO | WO-2014105892 A2 * | 7/2014 | ............. | G06Q 20/12 |
| WO | WO-2015105869 A1 * | 7/2015 | ........... | G06Q 20/202 |

*Primary Examiner* — Russell S Glass

(74) *Attorney, Agent, or Firm* — Bond, Schoeneck & King, PLLC

(57) ABSTRACT

Systems and methods for performing sales transactions using a hybrid multi-tenant cloud and single-tenant on-premises point-of-sale system. The multi-tenant cloud sub-system includes a remote processor that is communicably coupled with a first point-of-sale terminal at a first location and a second point-of-sale terminal at a second location, that is different than the first location. The remote processor is configured to process sales transaction information from the first and second point-of-sale terminals. The single-tenant on-premises sub-system includes a local processor communicably coupled with a third point-of-sale terminal at a third location, different than the first and second locations. The single-tenant on-premises sub-system is configured to process local sales transaction information from the third point-of-sale terminal and transmit the processed local sales transaction information to the multi-tenant cloud sub-system. The sales transaction information from the first and second point-of-sale terminals is synchronized with the local sales transaction information.

9 Claims, 4 Drawing Sheets

(56) References Cited

U.S. PATENT DOCUMENTS

| 2014/0156084 | A1 |  | 6/2014 | Rahman et al. |
| 2016/0005020 | A1 | * | 1/2016 | Fernando ............. G06Q 20/202 |
|  |  |  |  | 705/21 |
| 2016/0034876 | A1 |  | 2/2016 | Speiser et al. |
| 2016/0149952 | A1 | * | 5/2016 | Antonakakis ........... H04L 63/20 |
|  |  |  |  | 726/1 |
| 2018/0315035 | A1 |  | 11/2018 | Johnson et al. |
| 2020/0184440 | A1 |  | 6/2020 | Pennington et al. |
| 2021/0383343 | A1 | * | 12/2021 | Mangtani ............ H04L 43/0823 |
| 2022/0058723 | A1 |  | 2/2022 | Swett et al. |

* cited by examiner

Server 305

Processor 320

Memory 330

System Bus 360

Communications Interface 340

Database 315

Storage 350

Operating System 361
Data Processing Instructions 262
Communication Instructions 364
Product Pricing Instructions 265
Sales Logging Instructions 366
Loyalty or Rewards Instructions 367
Customer Account Data Instructions 368
Product Inventory Instructions 269

Network 310

POS₃

POS₄

300

HYBRID MULTI-TENANT CLOUD AND SINGLE-TENANT ON-PREMISES POINT-OF-SALE SYSTEMS

CROSS-REFERENCE TO RELATED APPLICATIONS

This application is a divisional application of U.S. patent application Ser. No. 17/449,521, filed on Sep. 30, 2021, and entitled "Hybrid Multi-Tenant Cloud and Single-Tenant On-Premises Point-Of-Sale Systems," the disclosure of which is incorporated herein by reference in its entirety.

FIELD OF THE DISCLOSURE

The present disclosure is directed generally to improved hybrid point-of-sale systems, and particularly to improved point-of-sale systems comprising an on-premises component and a cloud component.

BACKGROUND

A point-of-sale (POS) system is generally used to facilitate commercial transactions between a merchant or retailer and its customers. Point-of-sale systems can benefit from incorporating at least some or all of the system components in the cloud (i.e., software and services that run on the Internet, instead of on local hardware components.) However, while many retailers appreciate the benefits of a cloud-based point-of-sale system, such systems can be challenging for high volume business entities due to the limited latency and bandwidth associated with such cloud-based systems.

SUMMARY OF THE DISCLOSURE

There is a continued need for improved systems and methods for performing sales transactions based at least in part on the cloud at high-volume transaction sites, such as, convenience stores.

The present disclosure is directed at inventive systems and methods for completing sales transactions using a hybrid cloud/on-premises transaction system. Various embodiments and implementations herein are directed to a hybrid system having a first cloud-based point-of-sale system and a second local (non-cloud-based) point-of-sale system interconnected with each other. The local point-of-sale system is intended to operate in a high volume environment, such as a convenience store. The cloud-based point-of-sale system features a multi-tenant architecture where a single codebase is shared between a limitless number of users. The local point-of-sale system features a single-tenant architecture where a single codebase is provided to a single customer or user. The cloud-based point-of-sale system is configured to transmit a copy of a sales transaction engine to the local point-of-sale system. The local point-of-sale system is configured to receive and process, using the copy of the transaction engine, sales transaction information from a first point-of-sale terminal co-located with the local point-of-sale system. The local point-of-sale system is further configured to transmit the processed sales transaction information to the cloud-based point-of-sale system. The cloud-based point-of-sale system is further configured to synchronize the received processed sales transaction information from the at least one on-site server with the processed sales transaction information at least one remote processor.

According to one aspect, a hybrid point-of-sale system is provided. The hybrid system comprises a first point-of-sale system having at least one remote processor that is communicably coupled with a first point-of-sale terminal at a first location and a second point-of-sale terminal at a second location, that is different than the first location, wherein the at least one remote processor is configured to process sales transaction information from the first and second point-of-sale terminals. The hybrid system further comprises a second point-of-sale system having at least one local processor that is communicably coupled with a third point-of-sale terminal at a third location, that is different than the first and second locations. The first and second point-of-sale systems are communicably coupled to each other and the second point-of-sale system is configured to: process local sales transaction information from the third point-of-sale terminal; and transmit the processed local transaction information to the first point-of-sale system.

In embodiments, the at least one remote processor of the first point-of-sale system is further configured to synchronize the processed sales transaction information from the first and second point-of-sale terminals with the processed local transaction information received from the second point-of-sale system.

In embodiments, the first point-of-sale system is further configured to store attributes of the processed sales transaction information at a location remote from the first location or the second location.

In embodiments, the at least one local processor is configured to process the local sales transaction information from the third point-of-sale terminal using a copy a transaction engine operating at the first point-of-sale system.

In embodiments, the copy of the transaction engine is received from the first point-of-sale system.

In embodiments, the second point-of-sale system is configured to replicate the processed sales transaction information.

In embodiments, the second point-of-sale system is further configured to transmit the processed local transaction information periodically.

In embodiments, the second point-of-sale system is further configured to transmit the processed local transaction information when an amount of replicated information meets or exceeds a predetermined threshold amount of information.

In embodiments, the sales transaction information comprises one or more of information identifying a purchase transaction, information identifying the first or second point-of-sale terminals, or information associated with a payment instrument.

According to another aspect, a point-of-sale system is provided comprising (i) a memory configured to store a transaction engine; (ii) at least one remote processor that is configured to receive and process, using the stored transaction engine, sales transaction information from a first point-of-sale terminal at a first location and sales transaction information from a second point-of-sale terminal at a second location that is different than the first location; and (iii) a communications interface configured to transmit a copy of the transaction engine to at least one on-site server at a third location that is different than the first and second locations, wherein the communications interface is further configured to receive processed sales transaction information from the at least one on-site server. The at least one remote processor is further configured to synchronize the received processed sales transaction information from the at least one on-site server with the processed sales transaction information at the at least one remote processor from the first and second point-of-sale terminals.

In embodiments of the point-of-sale system, the sales transaction information comprises one or more of information identifying a purchase transaction, information identifying the first or second point-of-sale terminals, or information associated with a payment instrument.

In embodiments of the point-of-sale system, the processed sales transaction information that is received from the at least one on-site server is generated by the copy of the transaction engine.

In embodiments of the point-of-sale system, the communications interface is further configured to receive the processed sales transaction information periodically.

In embodiments of the point-of-sale system, the communications interface is further configured to transmit the synchronized information to at least one third party server.

According to a further aspect, a point-of-sale system is provided comprising (i) a communications interface configured to receive a copy of a transaction engine from at least one remote processor of another point-of-sale system; (ii) a memory configured to store the copy of the transaction engine; and (iii) at least one local processor that is configured to: receive and process, using the stored copy of the transaction engine, sales transaction information from a first point-of-sale terminal at a first location, wherein the first point-of-sale terminal is co-located with the at least one local processor; and replicate the processed sales transaction information. The communications interface is further configured to transmit the replicated processed sales transaction information to the another point-of-sale system.

In embodiments of the point-of-sale system, the communications interface is configured to transmit the replicated processed sales transaction information periodically.

In embodiments of the point-of-sale system, the communications interface is configured to transmit the replicated processed sales transaction information when an amount of replicated information meets or exceeds a predetermined threshold amount of information.

In embodiments of the point-of-sale system, the communications interface is configured to transmit the replicated processed sales transaction information after a period of time has expired after an amount of replicated information meets or exceeds a predetermined threshold amount of information.

In embodiments of the point-of-sale system, the copy of the transaction engine comprises sales transaction information from a second point-of-sale terminal at a second location that is different than the first location.

In embodiments of the point-of-sale system, the sales transaction information comprises one or more of information identifying a purchase transaction, information identifying the first or second point-of-sale terminals, or information associated with a payment instrument.

In various implementations, a processor or controller may be associated with one or more storage media (generically referred to herein as "memory," e.g., volatile, and non-volatile computer memory such as RAM, PROM, EPROM, and EEPROM, floppy disks, compact disks, optical disks, magnetic tape, etc.). In some implementations, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects as discussed herein. The terms "program" or "computer program" are used herein in a generic sense to refer to any type of computer code (e.g., software or microcode) that can be employed to program one or more processors or controllers.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

These and other aspects of the various embodiments will be apparent from and elucidated with reference to the embodiment(s) described hereinafter.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the various embodiments.

DETAILED DESCRIPTION OF EMBODIMENTS

The present disclosure describes various embodiments of improved systems and methods for performing sales transactions. Applicant has recognized and appreciated that a cloud-based system can be combined with an on-premises transaction system in a hybrid transaction system that allows merchants to achieve all of the benefits of a cloud-based POS system, while protecting against latency and bandwidth issues inherent at high-volume transaction sites, such as, convenience stores. As described herein, a cloud-based POS system can be used for sites having lower volume needs, and the on-premises transaction system can be used for a site having higher volume needs. Accordingly, exemplary improved systems described or otherwise envisioned herein provide a local POS system that features a single tenant architecture and a cloud-based POS system that features a multi-tenant architecture. The local POS system: (i) receives a copy of a sales transaction engine that is used in the cloud-based POS system; (ii) receives sales transaction information from an on-site POS terminal; (iii) processes the on-site sales transaction information using the copy of the sales transaction engine; and (iv) transmits a copy of the processed on-site sales transaction information to the cloud-based POS system. The cloud-based POS system synchronizes the sales transaction information from the on-site POS system with sales transaction information at the cloud-based POS system. Such synchronized information can be used with third party inventory or loyalty program management software, for example.

Figure 1:
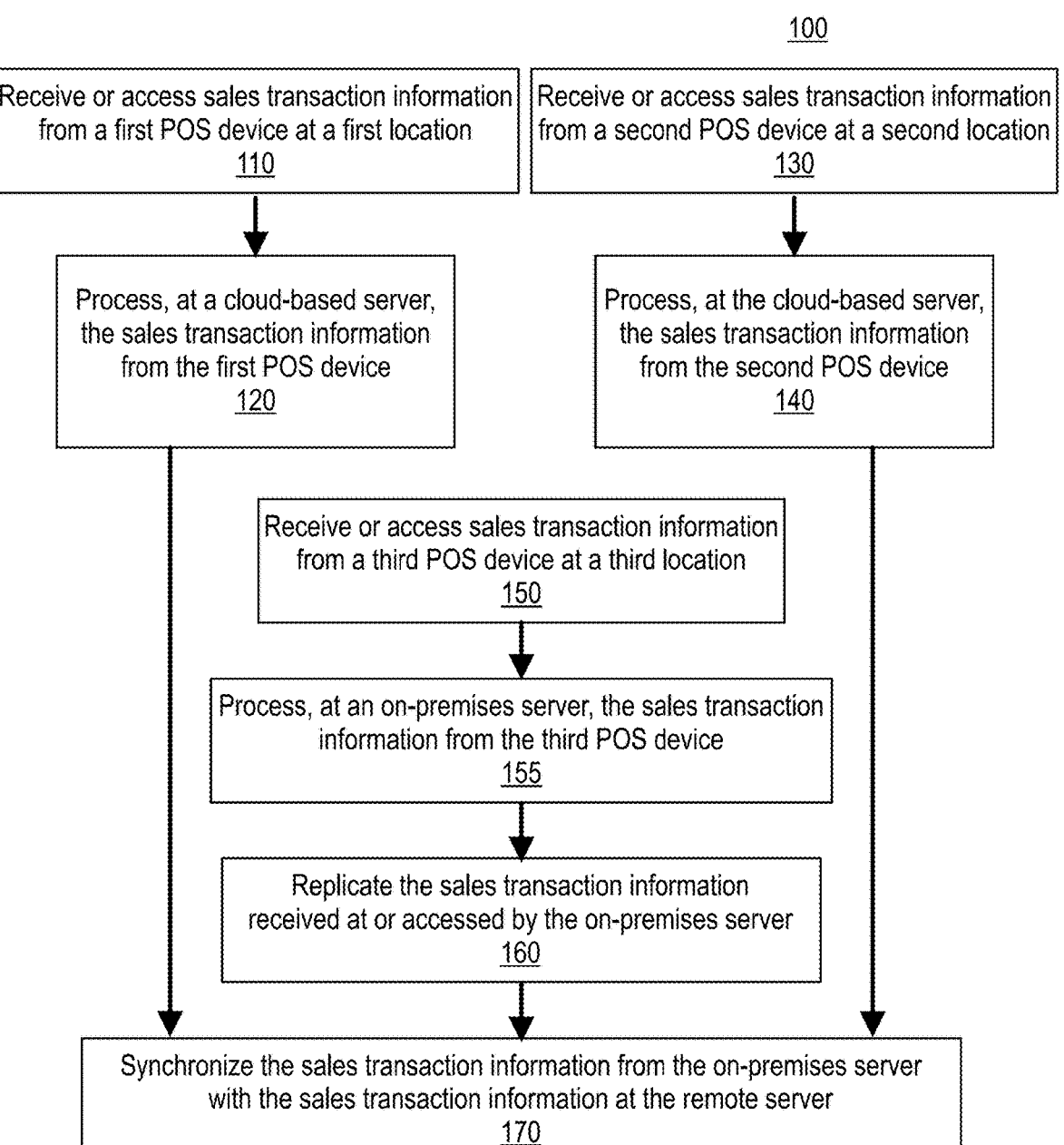
FIG. 1 is a flowchart illustrating an example method for performing a sales transaction using an inventive hybrid cloud/on-premises transaction system, in accordance with aspects of the present disclosure.

Referring to FIG. 1, in one embodiment, a flowchart of a method 100 for performing a sales transaction using an inventive hybrid cloud/on-premises transaction system is provided. The hybrid cloud/on-premises transaction system may be any hybrid transaction system described or otherwise envisioned herein.

Figure 2:
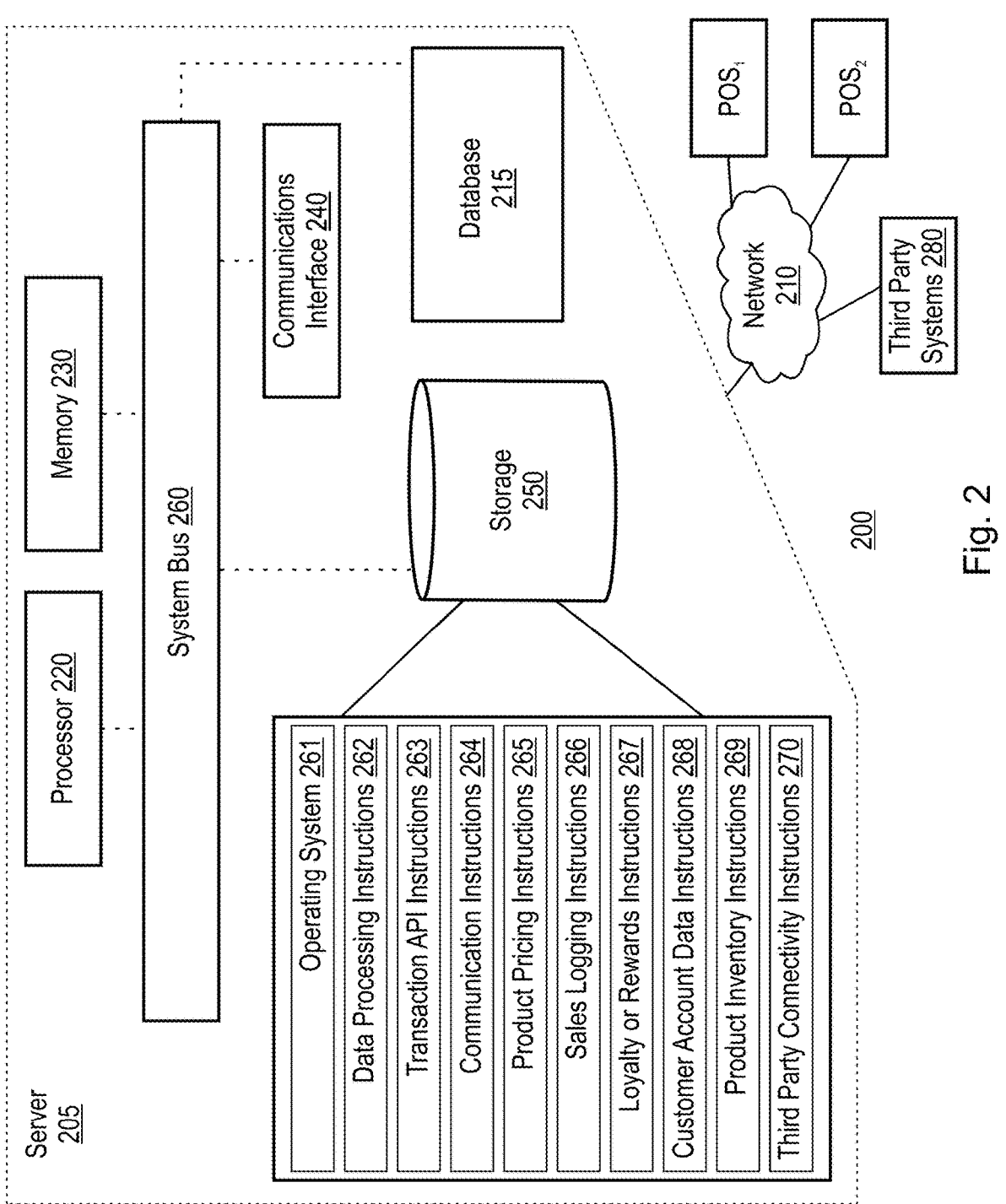
FIG. 2 is a schematic representation illustrating the cloud-based sub-system of the inventive hybrid transaction system, in accordance with aspects of the present disclosure.
Figure 3:
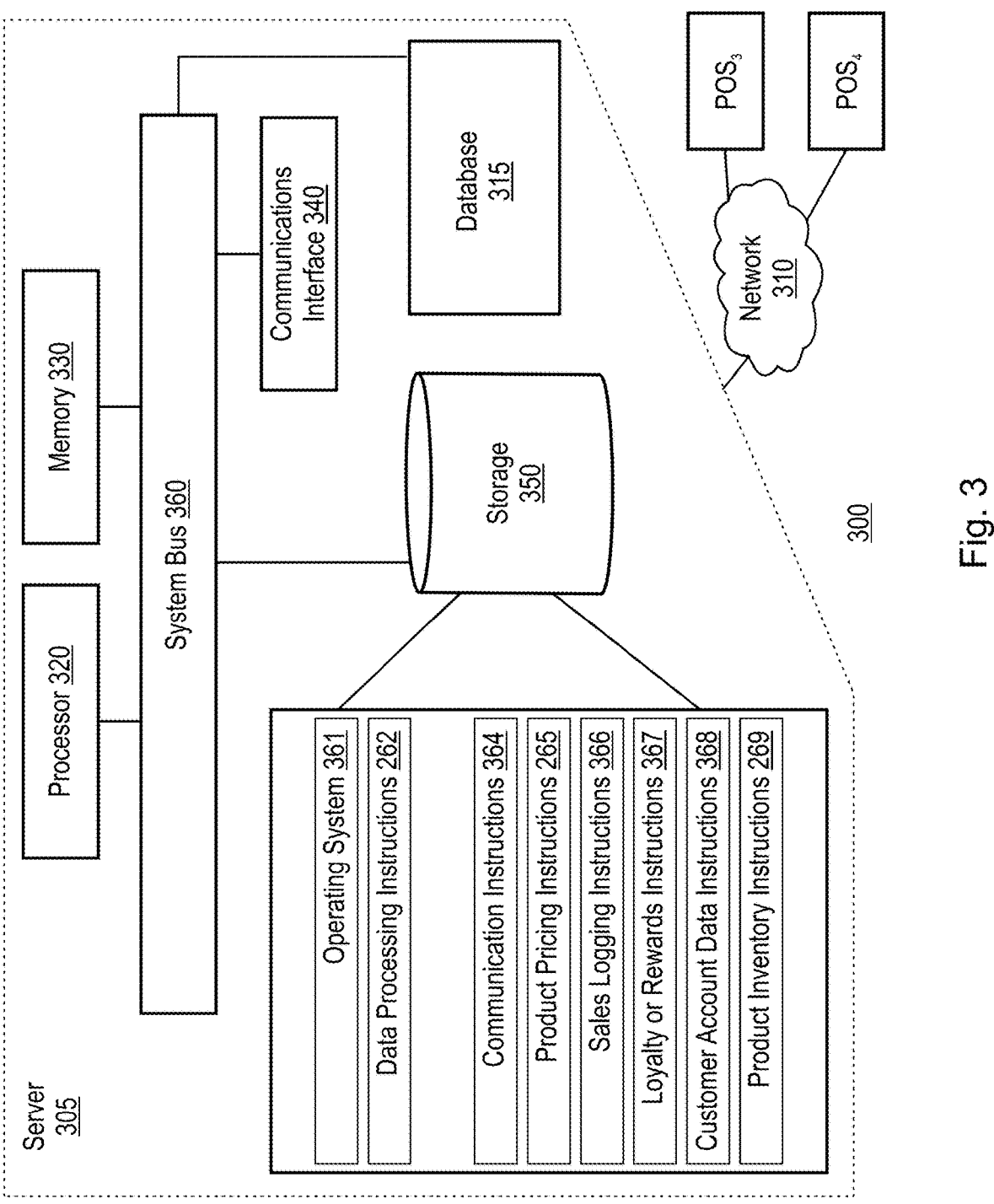
FIG. 3 is a schematic representation illustrating the on-premises sub-system of the inventive hybrid transaction system, in accordance with aspects of the present disclosure.

As discussed in greater detail herein, the hybrid transaction system comprises a cloud-based sub-system having a remote transaction server that is connected to multiple POS terminals at multiple locations of multiple entities. The hybrid transaction system further comprises a local sub-system having a local transaction server that is connected to one or more POS terminals at a location of a single entity. Referring to FIG. 2, in one embodiment, a schematic representation of the cloud-based sub-system of the hybrid transaction system is provided. FIG. 3 illustrates a schematic representation of the local sub-system of the hybrid transaction system. Sub-systems 200 and 300 may be any of the systems or sub-systems described or otherwise envisioned herein, and may comprise any of the components described or otherwise envisioned herein.

At step 110 of the method, a remote transaction server 205 receives or accesses information associated with a sales transaction from a point-of-sale (POS) terminal device $POS_1$ at a first location. The information associated with a sales transaction includes, but is not limited to, information identifying a purchase transaction, information identifying the POS terminal device $POS_1$, information associated with a payment instrument, etc. The information identifying a purchase transaction can include input specifying one or more items for purchase. The POS device $POS_1$ can be equipped to provide the input specifying one or more items for purchase by scanning Universal Product Code ("UPC") indicia on a product or product tag, detecting RFID or Near-Field Communication ("NFC") tags associated with a product, weighing a product, receiving item identifiers via a keyboard, receiving selections of items via a touchpad, etc. In embodiments, POS device $POS_1$ executes software instructions to transmit information identifying the requested purchase, the payment instrument, and/or the terminal device to transaction server 205 across network 210 using any one of the communications protocols described herein.

Network 210 may include any one or more different types of networks, such as cable networks, the Internet, wireless networks, and other private and/or public networks. In embodiments, a communication link can facilitate communication between POS device $POS_1$ to server 205 over network 210 and the communication link may include any suitable wireless connection. Any number of communications protocols, which include, but are not limited to, hypertext transfer protocol (HTTP) and transmission control protocol/internet protocol (TCP/IP) can be used to facilitate the communication between POS device $POS_1$ to server 205 over network 210.

In embodiments, the remote transaction server 205 provides a transaction application programming interface (API) for the POS device $POS_1$ by which the server 205 receives the information associated with the sales transaction.

The received information may be stored in one or more remote databases 215 which are in communication with remote transaction server 205. For example, the hybrid transaction system may comprise one or more remote databases or other memory configured to store the received sales transaction information.

At step 120 of the method, the remote transaction server 205 processes the received information to complete the sales transaction. In embodiments, the process to completing the sales transaction involves accessing a price book or other database and/or accessing a loyalty or rewards engine among other steps. In an example embodiment, remote transaction server 205 is configured to access account data for the purchaser in the one or more remote databases 215, and may update the accessed account data to reflect the purchase and authorize a transfer of funds to complete the sales transaction. In another example embodiment, remote transaction server 205 is configured to access inventory data in the one or more remote databases 215 or from one or more third party server(s) 280, and may update the accessed inventory data to reflect the purchase. In an embodiment, the remote transaction server 205 is configured to access account data, inventory data, and loyalty data or any combination of data.

At step 130 of the method, the remote transaction server 205 receives or accesses information associated with another sales transaction from another POS terminal device $POS_2$ at another location. The information associated with the sales transaction includes, but is not limited to, those types discussed above in step 110. In an embodiment, the remote transaction server 205 provides a transaction API by which it receives the information associated with the sales transaction. The transaction API for the POS terminal device $POS_2$ can be the same or different than transaction API for the POS terminal device $POS_1$.

At step 140 of the method, the remote transaction server 205 processes the received information to complete the sales transaction. The discussion above pertaining to step 120 of the method is also applicable to step 140 of the method.

At step 150 of the method, local transaction server 305 receives or accesses information associated with another sales transaction from another POS terminal device $POS_3$ at another location. The location for POS terminal device $POS_3$ can be a high volume site, such as, a convenience store. The received information may be stored in one or more local databases 315 which are embodied on or in communication with the local transaction server 305. For example, the hybrid transaction system described herein may also comprise one or more local databases or other memory configured to store information associated with a sales transaction in addition to the one or more remote databases or other memory.

At step 155 of the method, the local transaction server 305 processes the received information to complete the sales transaction. The discussions above pertaining to steps 120 and 140 of the method are also applicable to step 155 of the method in as much as the processes to complete the sales transactions are equivalent at the remote and local servers.

At step 160 of the method, local transaction server 305 replicates the received information and transmits the replicated information to the remote transaction server 205. The replicated information can be stored on the one or more remote databases 215 or other memory 230 or other storage. The local transaction server 305 can be configured to transmit the replicated information periodically, intermittently, when an amount of new replicated information meets or exceeds a predetermined threshold amount of information, etc. In embodiments, the local transaction server 305 can be configured to transmit the replicated information after a period of time has expired since an amount of replicated information meets or exceeds a predetermined threshold amount of information. In embodiments, the local transaction server 305 can be configured so that the replicated information is transmitted only when manually instructed to do so or only upon receiving a request from the remote transaction server 205.

At step 170 of the method, the remote transaction server 205 synchronizes the information received from the local on-premises server 305 with the information already received at remote transaction server 205 from POS terminal device POS₁ and POS terminal device POS₂. The hybrid transaction system can then communicate with third party systems 280 (e.g., an inventory management system and/or a loyalty management system) based on the synchronized information.

The hybrid transaction system allows merchants to use the remote transaction server 205 for sites having lower volume needs, while using the local transaction server 305 for a site having higher volume needs. Unfortunately, the cloud-based site level transaction APIs can suffer from reliability and effectiveness issues due to, for example, the number of concurrently running POS devices at a site having higher volume needs (e.g., a convenience store), a higher average amount of information associated with sales transactions, and/or due to the fact that convenience store-types of sites close infrequently. More specifically, the time needed to transfer information associated with a large number of sales transactions over the cloud-based site level transaction APIs is too long. Additionally, the amount of bandwidth needed to transfer information associated with a large number of sales transactions over the cloud-based site level transaction APIs is too limited. Sites having lower volume needs include, but are not limited to, food trucks and parking lot sales. Sites having higher volume needs include, but are not limited to, convenience stores. Thus, the hybrid transaction system allows merchants to achieve all of the benefits of a cloud-based POS system, while protecting against latency and bandwidth issues inherent at high-volume transaction sites, such as, convenience stores.

According to an embodiment, sub-system 200 comprises one or more computer systems associated with a business entity that provides products and/or services at multiple locations. In an example, sub-system 200 may be associated with a retailer having one or more physical retail locations disposed within a geographic area or region. The different physical locations need not provide the same goods and/or services. In an example embodiment, a business entity such as the one depicted in FIGS. 2 and 4 includes a first POS device POS₁ offering goods at a first location, such as, a parking lot and a second POS device POS₂ offering goods at a second location, such as, a mobile food truck. The business entity can provide different types of retail environments and any number of locations having any number of POS devices is contemplated.

Sub-system 200 comprises one or more of a processor 220, memory 230, communications interface 240, and storage 250 interconnected by one or more system buses 260. It will be understood that FIG. 2 constitutes, in some respects, an abstraction and that the actual organization of the components of the sub-system 200 may be different and more complex than illustrated. Additionally, while sub-system 200 is shown as including one of each described component, the various components may be duplicated in various embodiments. For example, processor 220 may include multiple microprocessors that are configured to independently execute the methods described herein or are configured to perform steps or subroutines of the methods described herein such that the multiple processors cooperate to achieve the functionality described herein. Further, since one or more components of sub-system 200 is implemented in a cloud-based computing system, the various hardware components may belong to separate physical systems. For example, processor 220 may include a first processor in a first server and a second processor in a second server. By way of another example, processor 220 may be housed in a first server and memory 230 may be housed in a second server in communication with the first server. Any one or more of database 215, processor 220, memory 230, communications interface 240, and storage 250 can be provided in separate remote servers and interconnected by a network connection instead of one or more system buses 260. Many other variations and configurations are possible.

According to an embodiment, sub-system 200 comprises a processor 220 capable of executing computer programs and/or sets of instructions stored in memory 230 or otherwise processing data to, for example, perform one or more steps of the method described herein. Example computer programs or instructions include, for example, machine code, such as code produced by a compiler, and files containing high-level code. Processor 220 may be formed of one or multiple modules. Processor 220 may take any suitable form, including but not limited to a microprocessor, microcontroller, multiple microcontrollers, circuitry, field programmable gate array (FPGA), application-specific integrated circuit (ASIC), a single processor, or plural processors.

Memory 230 may store the computer programs and/or sets of instructions that are loadable and executable on the processor 220, as well as data generated during the execution of these programs and/or instructions. Depending on the configuration, memory 230 may be volatile (such as random access memory (RAM)) and/or non-volatile (such as read-only memory (ROM), flash memory, etc.), or any other suitable form or device. The memory can store, among other things, an operating system. In example embodiments, the RAM is used by the processor 220 to temporarily store data. According to an embodiment, an operating system may contain code which, when executed by the processor, controls operation of one or more components of sub-system 200. It will be apparent that, in embodiments where the processor implements one or more of the functions described herein in hardware, the software described as corresponding to such functionality in other embodiments may be omitted.

Communications interface 240 allows software and data to be transmitted within the sub-system 200 and between the system and other external devices. Examples of a communications interface include, but are not limited to, a modem, a network interface (e.g., an Ethernet card), a communication sport, a personal computer memory card international association (PCMCIA) slot and card, etc. In an example embodiment, communications interface 240 may include a network interface card (NIC) configured to communicate according to Ethernet protocols. Additionally, communications interface 240 may implement a Transmission Control Protocol and the Internet Protocol (TCP/IP) stack for communication according to TCP/IP protocols. Software and/or data may be transferred by communications interface 240 in the form of signals, which may be electronic, electromagnetic, optical or other signals capable of being received by communications interface 240. The signals can comprise data packets sent to processor 220. Information representing processed packets can also be send in the form of signals from processor 220. Various alternative or additional hardware or configurations for communication interface 240 will be apparent.

Storage 250 may include one or more machine-readable storage media such as read-only memory (ROM), random-access memory (RAM), magnetic disk storage media, optical storage media, flash-memory devices, or similar storage media. In various embodiments, storage 250 may store instructions for execution by processor 220 or data upon which processor 220 may operate. For example, storage 250 may store an operating system 261 for controlling various operations of system 200.

It will be apparent that various information described as being stored in storage 250 may be additionally or alternatively stored in memory 230. In this respect, memory 230 may also be considered to constitute a storage device and storage 250 may be considered a memory. Various other arrangements will be apparent. Further, memory 230 and storage 250 may both be considered to be non-transitory machine-readable media. As used herein, the term non-transitory will be understood to exclude transitory signals but to include all forms of storage, including both volatile and non-volatile memories.

According to an embodiment, sub-system 200 may comprise or be in remote or local communication with a remote database or data source 215. Database 215 may be a single database or data source or multiple. Database 215 may store information provided by or used by one or more components of sub-system 200. Database 215 may also store the information associated with sales transactions from POS terminals $POS_1$ and $POS_2$ and $POS_3$, as described and/or envisioned herein. Database 215 can be configured to store elements of customer, account, and/or transaction data in data structures linked to information identifying corresponding users. For example, database 215 can store information identifying customized services, offers, and rewards presents to purchasers at POS terminals, and additionally, data records indicating a history of services, offers, and/or rewards accepted and/or rejected by customers/purchasers.

According to an embodiment, storage 250 of system 200 may store one or more algorithms and/or instructions to carry out one or more functions or steps of the methods described or otherwise envisioned herein. For example, storage 250 may comprise one or more of data processing instructions comprising one or more sales algorithms 262, transaction API instructions 263, communication instructions 264, product pricing instructions 265, sales transaction logging instructions 266, loyalty or rewards instructions 267, customer account data 268, product inventory instructions 269, and/or third party connectivity instructions 270. It should be appreciated that additional instructions for any other application that may be operating on or in conjunction with sub-system 200 are contemplated.

According to an embodiment, data processing instructions comprising one or more sales algorithms 262 direct the sub-system 200 to receive and process information associated with one or more sales transactions from POS devices $POS_1$ and $POS_2$. For example, the instructions 262 can direct sub-system 200 to receive or retrieve the sales transaction information to be used as needed, such as from database 215 among many other possible sources.

According to an embodiment, transaction API instructions 263 direct the sub-system 200 to provide a transaction API to POS devices $POS_1$ and $POS_2$ by which the server 205 receives the information associated with sales transactions.

According to an embodiment, communication instructions 264 direct the POS devices $POS_1$ and $POS_2$ to obtain information identifying the requested purchase, the payment instrument, and/or the terminal device, for example. Communication instructions 264 can also direct the POS devices $POS_1$ and $POS_2$ to provide the obtained information to the server 205 over the network 210. Communication instructions 264 can be incorporated with transaction API instructions 263 in embodiments. Communication instructions 264 can also facilitate communication between sub-system 200 and third party systems 280 and communication between sub-system 200 and sub-system 300. Communication instructions 264 can also be used to select an operational mode or communication medium for use by the POS devices.

According to an embodiment, product pricing instructions 265 can direct sub-system 200 to determine or compute a total price to be charged for the goods and/or services in a sales transaction. In embodiments, the instructions direct the sub-system 200 to take into consideration any number or type of rewards, coupons, and/or discounts to be applied toward the sales transaction.

According to an embodiment, sales transaction logging instructions 266 can direct sub-system 200 to capture and store sales transaction data in a format known as a transaction log (TLOG), for example. In embodiments, such sales transaction data comprises attributes of one or more transactions including, but not limited to, customer information, sales price, discount price, quantities, item descriptions, etc. The sales transaction data can be used for sales auditing, reporting, and input for separate planning applications or planning/management applications from third parties.

According to an embodiment, loyalty or rewards instructions 267 can direct sub-system 200 to capture and store loyalty or reward program information that can be accessed by a third party inventory management program. An example third party loyalty management provider is Professional Datasolutions, Inc. (PDI), headquartered in Temple, Texas.

According to an embodiment, customer account data instructions 268 can direct sub-system 200 to access and/or update account data for a customer.

According to an embodiment, product inventory instructions 269 can direct sub-system 200 to access and/or update product inventory information based on sales transaction information from the locations that are part of sub-system 200. Product inventory instructions 269 can also direct sub-system 200 to update product inventory information based on sales transaction information received from sub-system 300 as further described herein. Such product inventory information can be used for sales auditing, reporting, and input for separate planning applications or planning/management applications from third parties. The product inventory information can be used with an example third party inventory management provider, such as BlueYonder (formerly JDA Software), headquartered in Scottsdale, Arizona.

According to an embodiment, third party connectivity instructions 270 can direct sub-system 200 to facilitate sharing connectivity between the multiple locations of the sub-system and one or more third party systems 280.

According to an embodiment, sub-system 300 comprises one or more computer systems associated with a business entity that provides products and/or services at a single location. The business entity is the same business entity associated with sub-system 200 in embodiments. In an example, sub-system 300 may be associated with a high volume physical retail location of a retailer. In an example embodiment, a business entity such as the one depicted in FIGS. 3 and 4 includes POS device POS₃ offering goods at a location, such as, a convenience store. The convenience store location of the business entity can provide different types of retail environments and any number of POS devices is contemplated.

Sub-system 300 comprises one or more of a processor 320, memory 330, communications interface 340, and storage 350 interconnected by one or more system buses 360 or suitable alternative. It will be understood that FIG. 3 constitutes, in some respects, an abstraction and that the actual organization of the components of the sub-system 300 may be different and more complex than illustrated. Additionally, while sub-system 300 is shown as including one of each described component, the various components may be duplicated in various embodiments. For example, processor 320 may include multiple microprocessors that are configured to independently execute the methods described herein or are configured to perform steps or subroutines of the methods described herein such that the multiple processors cooperate to achieve the functionality described herein. Many other variations and configurations are possible.

The discussions above pertaining to the structures and functionalities of processor 220, memory 230, communications interface 240, and storage 250 are applicable to processor 320, memory 330, communications interface 340, and storage 350. An operating system 361 can be stored on storage 350 for controlling various operations of sub-system 300.

According to an embodiment, sub-system 300 may comprise or be in remote or local communication with a remote database or data source 315. Database 315 may be a single database or data source or multiple. Database 315 may store information provided by or used by one or more components of sub-system 300. Database 315 may also store the information associated with sales transactions from POS terminals POS₃ and POS₄, as described and/or envisioned herein. Database 315 can be configured to store elements of customer, account, and/or transaction data in data structures linked to information identifying corresponding users. For example, database 315 can store information identifying customized services, offers, and rewards presents to purchasers at POS terminals, and additionally, data records indicating a history of services, offers, and/or rewards accepted and/or rejected by customers/purchasers.

According to an embodiment, storage 350 of sub-system 300 may store one or more algorithms and/or instructions to carry out one or more functions or steps of the methods described or otherwise envisioned herein. For example, storage 350 may comprise one or more of data processing instructions comprising one or more sales algorithms 262 which is a copy from sub-system 200, communication instructions 364, product pricing instructions 265 which is a copy from sub-system 200, sales transaction logging instructions 366, loyalty or rewards instructions 367, customer account data 368, and/or product inventory instructions 269 which is a copy from sub-system 200. Notably, storage 350 does not need to include transaction API instructions 263 or third party connectivity instructions 270 as sub-system 300 is not configured to carry out the functions or steps corresponding to these instructions. It should be appreciated that one or more of communication instructions 364, sales transaction logging instructions 366, loyalty or rewards instructions 367, customer account data 368 can include overlap with the corresponding instructions provided at sub-system 200. It should further be appreciated that additional instructions for any other application that may be operating on or in conjunction with sub-system 300 are contemplated.

According to an embodiment, data processing instructions comprising one or more sales algorithms 262 direct the sub-system 200 to receive and process information associated with one or more sales transactions from POS devices POS₃ and POS₄. For example, the instructions 262 can direct sub-system 300 to receive or retrieve the sales transaction information to be used as needed, such as from database 315 among many other possible sources.

According to an embodiment, communication instructions 364 direct the POS devices POS₃ and POS₄ to obtain information identifying the requested purchase, the payment instrument, and/or the terminal device, for example. Communication instructions 364 can also direct the POS devices POS₃ and POS₄ to provide the obtained information to the server 305 over the network 310. Communication instructions 364 can also facilitate communication between sub-system 200 and sub-system 300. Communication instructions 364 can also be used to select an operational mode or communication medium for use by the POS devices POS₃ and POS₄.

Network 310 may include any one or more different types of networks, such as cable networks, the Internet, wireless networks, and other private and/or public networks. In embodiments, a communication link can facilitate communication between POS device POS₃ to server 305 over network 310 and the communication link may include any suitable a wireless connection. Any number of communications protocols, which include, but are not limited to, hypertext transfer protocol (HTTP) and transmission control protocol/internet protocol (TCP/IP) can be used to facilitate the communication between POS device POS₃ and/or POS device POS₄ to server 305 over network 310.

According to an embodiment, product pricing instructions 265 can direct sub-system 300 to determine or compute a total price to be charged for the goods and/or services in a sales transaction. In embodiments, the instructions direct the sub-system 300 to take into consideration any number or type of rewards, coupons, and/or discounts to be applied toward the sales transaction.

According to an embodiment, sales transaction logging instructions 366 can direct sub-system 300 to capture and store sales transaction data in a format known as a TLOG, for example. In embodiments, such sales transaction data comprises attributes of one or more transactions including, but not limited to, customer information, sales price, discount price, quantities, item descriptions, etc. The sales transaction data can be used for synchronizing with the sales transaction data generated at sub-system 200 and sales auditing, reporting, and input for separate planning applications or planning/management applications from third parties.

According to an embodiment, loyalty or rewards instructions 367 can direct sub-system 300 to capture and store loyalty or reward program information for customers.

According to an embodiment, customer account data instructions 368 can direct sub-system 300 to access and/or update account data for one or more customers.

According to an embodiment, product inventory instructions 269 can direct sub-system 300 to access and/or update product inventory information based on sales transaction information from the POS devices that are part of sub-system 300.

The hybrid transaction system allows multiple locations to share a common price book, sales journal, and connectivity to third party systems, for example, using sub-system 200. At the same time, a single tenant instance of the same transaction engine used in sub-system 200 is deployed at a single high-volume site, such as, a convenience store in sub-system 300. The single tenant instance can comprise at least one or more of data processing instructions comprising one or more sales algorithms 262, product pricing instructions 265, and/or product inventory instructions 269 and the data that corresponds to these programs and/or sets of instructions. The single tenant sales engine drives all devices at the convenience store site in sub-system 300. Having a single tenant instance of the same transaction engine used in sub-system 200 also in sub-system 300 is furthermore advantageous since sub-system 200 can reinstall the single tenant instance of the transaction engine in the event of a failure at sub-system 300. The transaction engine at sub-system 200 can also serve as a backup sales engine for the on-site system in the event of a failure.

Additionally, sub-system 300 is configured to replicate its sales transaction data and transmit the replicated sales transaction data to the cloud-based server 205 of sub-system 200. In an embodiment, the replicated data can be stored on the one or more local databases or other memory or other storage. The local transaction server 305 can be configured to transmit the replicated data periodically, intermittently, when an amount of new replicated information meets or exceeds a predetermined threshold amount of information, etc. In a preferred embodiment, the data is transmitted on a regular basis or regularly to ensure that all transaction records are written and saved to the cloud.

Figure 4:
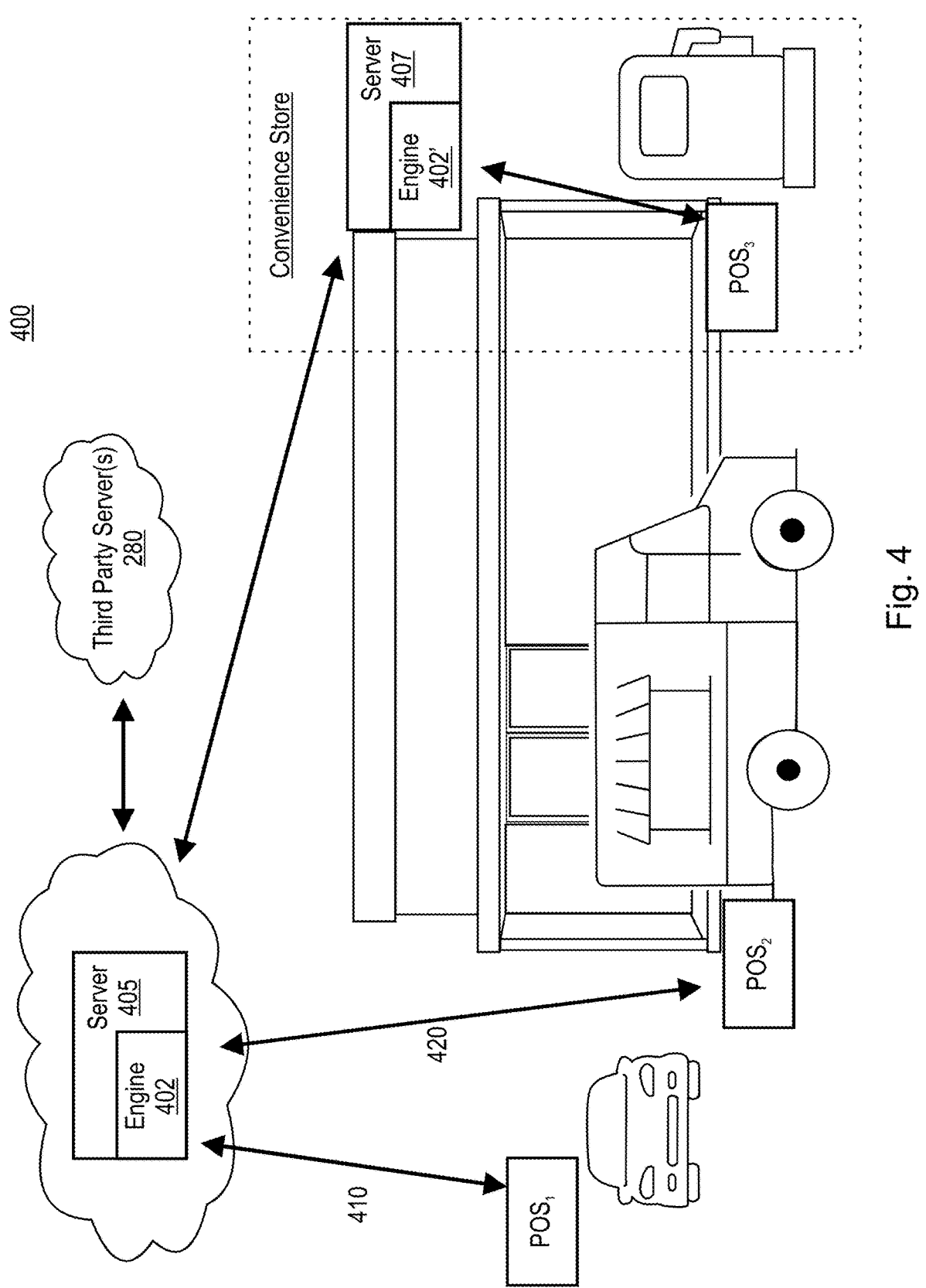
FIG. 4 is a schematic representation illustrating the inventive hybrid cloud/on-premises transaction system, in accordance with aspects of the present disclosure.

Referring to FIG. 4, in one embodiment, a schematic representation illustrating the hybrid transaction system 400 is provided. A cloud-based transaction engine 402 that is capable of computing sales for POS devices $POS_1$ and $POS_2$ at multiple locations is provided on server 405. Server 405 is akin to server 205 as discussed herein. Each of POS devices $POS_1$ and $POS_2$ at the multiple locations is configured to transmit information associated with sales transactions using a transaction API. POS device $POS_1$ uses transaction API 410. POS device $POS_2$ uses transaction API 420. Thus, the multiple locations represented by $POS_1$ and $POS_2$ can share a common price book, sales journal, and connectivity to third party systems on server(s) 480, for example. Such servers 480 are akin to systems 280 as discussed herein.

At the same time, a single tenant transaction engine 402', that is identical to transaction engine 402, is deployed at on-site server 407. Server 407 is akin to server 305 as discussed herein. Engine 402' is configured to drive all devices at the site including POS device $POS_3$. Engine 402' is also configured to replicate the sales transaction information generated at the engine 402' and transmit the replicated information to engine 402 regularly or as otherwise described or envisioned herein. It should be appreciated that the replicated information can be transmitted directly to engine 402 or indirectly via one or more other components. If engine 402' experiences a failure, engine 402 can reinstall a new single tenant transaction engine at server 407. Engine 402 can also serve as a backup sales engine for the POS engine at server 407.

It should be appreciated that the POS device terminals discussed herein may exchange information with sub-systems 200 or 300 to purchase one or more goods and/or services using various payment instruments. The POS device terminals correspond to a physical or virtual device that is configured to communicate with a corresponding one or more networks to provide payment services and to perform point-of-sale processes. Such devices may include, but are not limited to, handheld devices, desktop-type devices, kiosk-style devices, and/or register-style devices. In embodiments where the POS device terminal is virtual, the terminal corresponds to one or more software modules executed at least by the processors of sub-systems 200 and/or 300 and one or more customer devices such as a mobile phone.

The systems and methods described herein advantageously allow: (i) the ability to replicate between the cloud-based system and the local system; (ii) the ability to backup data from the cloud-based transaction engine; (iii) the use of APIs to rapidly deploy non high-volume systems; (iv) the use of a common price book, electronic journal and all point-of-sale functions across an entire retail estate; (v) rapid support for new hardware form factors; and (vi) all connections to above site systems through the cloud reducing purchase or originated credit-impaired (POCI) scope.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

What is claimed is:

1. A multi-tenant point-of-sale system, comprising:
a memory configured to store a transaction engine;
at least one remote processor that is configured to receive and process, using the stored transaction engine, sales transaction information from multiple point-of-sale terminals at multiple locations of multiple entities including a first point-of-sale terminal at a first location and a second point-of-sale terminal at a second location that is different than the first location; and
a communications interface configured to transmit a copy of the transaction engine to at least one on-site server at a third location that is different than the first and second locations, the copy of the transaction engine being a single tenant instance of the transaction engine that is stored in a memory of the on-site server;
wherein the communications interface is further configured to receive processed sales transaction information from the at least one on-site server whenever an amount of replicated information meets or exceeds a predetermined threshold amount of information, wherein the processed sales transaction information was processed using the copy of the transaction engine transmitted to the at least one on-site server; and
wherein the at least one remote processor is further configured to:
provide a first transaction application programming interface (API) to the first point-of-sale terminal and a second transaction API to the second point-of-sale terminal, the first transaction API being different than the second transaction API;
receive the sales transaction information from the first and second point-of-sale terminals via the first and second transaction APIs, respectively;

process the received sales transaction information from the first and second point-of-sale terminals, without the on-site server, by accessing account data for one or more purchasers in one or more remote databases and updating the accessed account data to reflect one or more sales transactions and authorize a transfer of funds to complete the one or more sales transactions; and
synchronize the received processed sales transaction information from the at least one on-site server with the processed sales transaction information at the at least one remote processor from the first and second point-of-sale terminals.

2. The point-of-sale system of claim 1, wherein the sales transaction information comprises one or more of information identifying a purchase transaction, information identifying the first or second point-of-sale terminals, or information associated with a payment instrument.

3. The point-of-sale system of claim 1, wherein the communications interface is further configured to receive the processed sales transaction information periodically.

4. The point-of-sale system of claim 1, wherein the communications interface is further configured to transmit the synchronized information to at least one third party server.

5. A single tenant point-of-sale system, comprising:
a communications interface configured to receive a copy of a transaction engine from at least one remote processor of a multi-tenant point-of-sale system, wherein the copy of the transaction engine is a single tenant instance of the transaction engine;
a memory configured to store the copy of the transaction engine; and
at least one local processor that is configured to:
receive and process, using the stored copy of the transaction engine, sales transaction information from a first point-of-sale terminal at a first location, wherein the sales transaction information is processed without the multi-tenant point-of-sale system by accessing account data for one or more purchasers in one or more remote databases and updating the accessed account data to reflect one or more sales transactions and authorize a transfer of funds to complete the one or more sales transactions, and wherein the first point-of-sale terminal is co-located with the at least one local processor; and
replicate the processed sales transaction information;
wherein the communications interface is further configured to transmit the replicated processed sales transaction information to the multi-tenant point-of-sale system whenever an amount of replicated information meets or exceeds a predetermined threshold of information.

6. The point-of-sale system of claim 5, wherein the communications interface is configured to transmit the replicated processed sales transaction information periodically.

7. The point-of-sale system of claim 5, wherein the communications interface is configured to transmit the replicated processed sales transaction information after a period of time has expired after an amount of replicated information meets or exceeds a predetermined threshold amount of information.

8. The point-of-sale system of claim 5, wherein the copy of the transaction engine comprises sales transaction information from a second point-of-sale terminal at a second location that is different than the first location.

9. The point-of-sale system of claim 5, wherein the sales transaction information comprises one or more of information identifying a purchase transaction, information identifying the first or second point-of-sale terminals, or information associated with a payment instrument.

* * * * *